(12) United States Patent
Gibbons, II et al.

(10) Patent No.: US 11,790,794 B2
(45) Date of Patent: Oct. 17, 2023

(54) SYSTEM AND METHOD FOR COMMUNITY PROVIDED WEATHER UPDATES FOR AIRCRAFT

(71) Applicant: ApiJet LLC, Seattle, WA (US)

(72) Inventors: Robert Thomas Gibbons, II, Seattle, WA (US); Thomas Jay Horsager, Grove Heights, MN (US); Eric Sabbaton Merrifield, Jr., Seattle, WA (US)

(73) Assignee: ApiJet, LLC, Seattle, WA (US)

( * ) Notice: Subject to any disclaimer, the term of this patent is extended or adjusted under 35 U.S.C. 154(b) by 315 days.

(21) Appl. No.: 17/338,051

(22) Filed: Jun. 3, 2021

(65) Prior Publication Data

US 2021/0383708 A1 Dec. 9, 2021

Related U.S. Application Data

(60) Provisional application No. 63/035,149, filed on Jun. 5, 2020.

(51) Int. Cl.
*G08G 5/00* (2006.01)
*G01W 1/02* (2006.01)
*G01W 1/00* (2006.01)

(52) U.S. Cl.
CPC ............ *G08G 5/0091* (2013.01); *G01W 1/02* (2013.01); *G08G 5/003* (2013.01); *G08G 5/0013* (2013.01);
(Continued)

(58) Field of Classification Search
CPC .. G08G 5/0091; G08G 5/0013; G08G 5/0021; G08G 5/003; G08G 5/0052;
(Continued)

(56) References Cited

U.S. PATENT DOCUMENTS 9,511,877 B2 * 12/2016 Masson .................. B64D 43/00
2010/0042275 A1    2/2010 Kirk
(Continued)

OTHER PUBLICATIONS

International Searching Authority of the PCT; Notification of Transmittal of the International Search Report and the Written Opinion of the International Searching Authority; PCT Application No. PCT/US21/35866 filed Jun. 4, 2021; dated Sep. 8, 2021 (pp. 1-10).

*Primary Examiner* — Behrang Badii
(74) *Attorney, Agent, or Firm* — FisherBroyles LLP; Alan D. Minsk

(57) ABSTRACT

Systems, apparatuses, and methods for acquiring information regarding weather conditions along a flightpath from other aircraft and incorporating that information into a flight path optimization and planning system. The system and methods may acquire substantially real-time information from pilots or other crew who have encountered a weather system or event (e.g., a wind direction or speed measurement, an observation of a storm or lightning, an observation of a difficulty in controlling an aircraft, unexpected excessive turbulence, etc.) and share that information with other airborne pilots or crew, either directly or using a ground-based server. The server may receive and process the acquired information and determine which aircraft may be likely to encounter or be impacted by a weather system or event for which it has received additional weather-related data and information.

20 Claims, 6 Drawing Sheets

(52) U.S. Cl.
CPC ..... *G08G 5/0021* (2013.01); *G01W 2001/003* (2013.01); *G01W 2001/006* (2013.01)

(58) Field of Classification Search
CPC ................. G08G 5/0039; G01W 1/02; G01W 2001/003; G01W 2001/006
See application file for complete search history.

(56) References Cited

U.S. PATENT DOCUMENTS

| | | |
|---|---|---|
| 2015/0088342 A1 | 3/2015 | Conner et al. |
| 2016/0133137 A1 | 5/2016 | Rencher et al. |
| 2017/0345318 A1 | 11/2017 | Kim et al. |
| 2019/0041233 A1* | 2/2019 | Duerksen ............. G08G 5/0034 |
| 2021/0005093 A1* | 1/2021 | Dunsdon ................ G06Q 50/28 |

* cited by examiner

SYSTEM AND METHOD FOR COMMUNITY PROVIDED WEATHER UPDATES FOR AIRCRAFT

CROSS REFERENCE TO RELATED APPLICATION

This application claims the benefit of U.S. Provisional Application No. 63/035,149, titled "System and Method for Community Provided Weather Updates for Aircraft," filed Jun. 5, 2020, the disclosure of which is incorporated in its entirety (including the Appendices) herein, by this reference.

BACKGROUND

An important aspect of operating an aircraft is flight planning and the optimization of flight trajectories as an aircraft encounters weather systems and other hazards. Flight path changes may be applied to accomplish one or more of minimizing fuel consumption, avoiding turbulence, or reducing transit time. One system for calculating or performing these route and trajectory changes or optimizations is referred to as the Traffic Aware Strategic Aircrew Requests system, sometimes abbreviated as TASAR. The TASAR system was developed by NASA and is available for use by the flight crew of an aircraft, typically as an application that is part of their Electronic Flight Bag System (EFB). The TASAR system includes a software application, a server component, a ground feed provided set of services, and a configuration component. Together these components and processes are used to plan and optimize aircraft trajectory and form what is termed a Traffic Aware Planner (TAP). The TAP functional module(s) automatically monitor for flight optimization opportunities in the form of lateral and/or vertical changes to the flight trajectory.

A detailed description of the TASAR system and its capabilities may be found in the document entitled "Traffic Aware Strategic Aircrew Requests (TASAR), Traffic Aware Planner (TAP), Interface Control Document (ICD)" contained in the Appendix to the provisional application from which the present application claims benefit. Additional information on the TASAR system may be found on-line from NASA and other sources.

The TASAR system includes an automated cockpit component that monitors data and sensor feeds for potential improvements to the flight trajectory and displays these to a pilot. The potential flight trajectory changes are evaluated for potential conflicts with known airplane traffic, known weather hazards, and airspace restrictions. However, any actual route change must be authorized by Air Traffic Control, and depending on policy, sometimes also Airline Dispatch. One objective of the TASAR system is to improve the process by which pilots request flight path and altitude modifications due to changing flight conditions. As noted, changes may be requested to reduce flight time, decrease fuel consumption, or improve another flight attribute desired by the operator of an aircraft.

As is evident from the above description, flight trajectory planning, route optimization and changes to trajectory during actual flights may depend on a variety of factors, including weather conditions that are encountered or predicted to be encountered. However, weather patterns, weather events, and weather systems may change over relatively short timescales and distances. As a result, weather systems and weather events may be localized and only likely to impact flights through certain regions or cells and at certain times or during certain time intervals.

Conventional approaches to incorporating weather information into a flight planning system rely on specific inputs related to hazardous weather that are based on radar and satellite feeds. However, a problem with this approach is that weather systems may change very quickly along a projected flight path and even a 15-minute old update may be incorrect. This is undesirable and, in some cases, may create a safety hazard as reliance on a stale weather update may cause a flight to experience excessive turbulence, unexpected fuel consumption, or delays. Thus, systems and methods are needed for acquiring and effectively incorporating information regarding current or expected weather systems into flight trajectory planning systems and methods. Embodiments are directed toward solving these and other problems individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

Embodiments are directed to systems, apparatuses, and methods for improving the ability of the pilot of an aircraft to make decisions regarding flight path changes due to weather systems and events. In some embodiments, this is accomplished by providing substantially real time (or at least more current) weather-related data and information from other pilots who have recently encountered or are encountering a weather system or event along the currently planned trajectory of the aircraft. In some embodiments, the weather data and information may comprise a comment, evaluation, or sensor measurement related to a weather event.

In some embodiments, the observations, comments, or data may be provided by pilots in other aircraft using a direct plane-to-plane communications system, such as a radio or messaging application. In some embodiments, the observations, comments, or data may be provided by pilots to a ground-based server that collects and processes the received information to make it available to be sent to other aircraft. In some embodiments, an application may provide a visual map or display that identifies a weather event and associates that event with a comment or evaluation of the event. In some embodiments, the comment or evaluation may be provided by a pilot or other crew member. In some embodiments, the comment or evaluation may be generated by an application in response to data collected by sensors or cameras on one or more other aircraft. In some embodiments, the weather-related observations, comments, or data provided by other aircraft may be presented to a crew member of an aircraft receiving the data and information as an overlay to an image of the receiving aircraft's trajectory. The overlay or overlays may include indications of weather systems, weather events, observations or measurements provided by other aircraft, and in some embodiments, suggested route changes to avoid or minimize the impact of a weather system or event.

In some embodiments, data regarding a specific aircraft crew's comments or evaluations may be collected and processed to evaluate the reliability of that source of comments or evaluations. A measure of the reliability may be associated with the comments or evaluations and presented as additional information to other aircraft. In some embodiments, a measurement of a weather system or event may comprise a wind velocity or other characteristic of the event and be measured by a sensor on the other aircraft and automatically provided to aircraft expected to encounter the weather system or event.

In some embodiments, the weather-related data may be collected from one or more other aircraft and integrated with the TASAR flight trajectory planning system (or a supplementary flight planning system) to generate a suggested route change for a pilot. In some embodiments, the weather-related data may be presented to a pilot and their approval requested before the data is integrated with the TASAR or other flight trajectory planning system.

In some embodiments, the described methods include a process, method, function, or operation performed in response to the execution of a set of computer-executable instructions or software, where the instructions are stored in (or on) one or more non-transitory electronic data storage elements or memory. In some embodiments, the set of instructions may be conveyed to an aircraft or to a network element with which the aircraft is in communication from a remote server over a network. The set of instructions may be executed by an electronic processor or data processing element (e.g., CPU, GPU, controller, etc.). The data processing element may be contained in an on-board system, a remote server, a network element, a handheld device, or in some cases, another aircraft.

In one embodiment, the disclosure is directed to a system for providing and using more current updates to weather systems and events during the operation of an aircraft. The system may comprise a set of computer-executable instructions and a processor or processors programmed to execute the set of instructions. When executed, the set of instructions may cause the processor or processors (or a device or apparatus in which the processor or processors are contained) to perform one or more operations or functions, where the operations or functions comprise:

operating a client device on one or more of a plurality of aircraft to receive inputs regarding weather systems and events encountered during a flight;

providing the received inputs to a ground-based server;

operating the ground-based server to perform one or more functions comprising determining if additional weather-related data and information is available for a selected aircraft flight based on a trajectory of the selected aircraft and a location of a weather system or event in weather-related data and information received from one or more of the plurality of aircraft; and a providing the additional weather-related data and information to the selected aircraft if the selected aircraft is expected to encounter or be impacted by the weather system or event;

where an application installed on the client device of the selected aircraft further configures the device to receive the additional weather-related data and information;

generate a user interface element to allow a crew member to accept the received data and information; and if the crew member accepts the received data and information, then generate one or more displays showing the trajectory of the selected aircraft and the weather system or event in relation to the trajectory.

In another embodiment, the disclosure is directed to a method for providing and using more current updates to weather systems and events during the operation of an aircraft, where the method may include one or more processes, operations, or functions, where the processes, operations, or functions comprise:

acquiring data and information from a plurality of aircraft regarding weather systems and events encountered during a flight of each of the plurality of aircraft;

providing the acquired data and information to a ground-based server;

operating the ground-based server to perform one or more functions comprising determining if additional weather-related data and information is available for a selected aircraft flight based on a trajectory of the selected aircraft and a location of a weather system or event in the acquired data and information from one or more of the plurality of aircraft; and providing the additional weather-related data and information to the selected aircraft if the selected aircraft is expected to encounter or be impacted by the weather system or event;

receiving the provided additional weather-related data and information at the selected aircraft, wherein a device on the selected aircraft is configured to generate a user interface element to allow a crew member to accept the received data and information; and if the crew member accepts the received data and information, then to generate one or more displays showing the trajectory of the selected aircraft and the weather system or event in relation to the trajectory.

In yet another embodiment, the disclosure is directed to a set of computer-executable instructions, where when executed by a processor or processors, the set of instructions cause the processor or processors (or a device or apparatus in which the processor or processors are contained) to perform one or more processes, operations, or functions, where the processes, operations, or functions comprise:

acquiring data and information from a plurality of aircraft regarding weather systems and events encountered during a flight of each of the plurality of aircraft using an application installed on a device used by a crew member of each of the plurality of aircraft;

receiving the acquired data and information at a ground-based server;

operating the ground-based server to perform one or more functions comprising determining if additional weather-related data and information is available for a selected aircraft flight based on a trajectory of the selected aircraft and a location of a weather system or event in the acquired data and information from one or more of the plurality of aircraft; and providing the additional weather-related data and information to the selected aircraft if the selected aircraft is expected to encounter or be impacted by the weather system or event;

operating the device used by a crew member of the selected aircraft to receive the provided additional weather-related data and information, wherein the device used by the crew member of the selected aircraft is configured to generate a user interface element to allow a crew member to accept the received data and information; and if the crew member accepts the received data and information, then to generate one or more displays showing the trajectory of the selected aircraft and the weather system or event in relation to the trajectory.

Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

BRIEF DESCRIPTION OF THE DRAWINGS

Embodiments in accordance the present disclosure will be described with reference to the drawings, in which.

Figure 1:
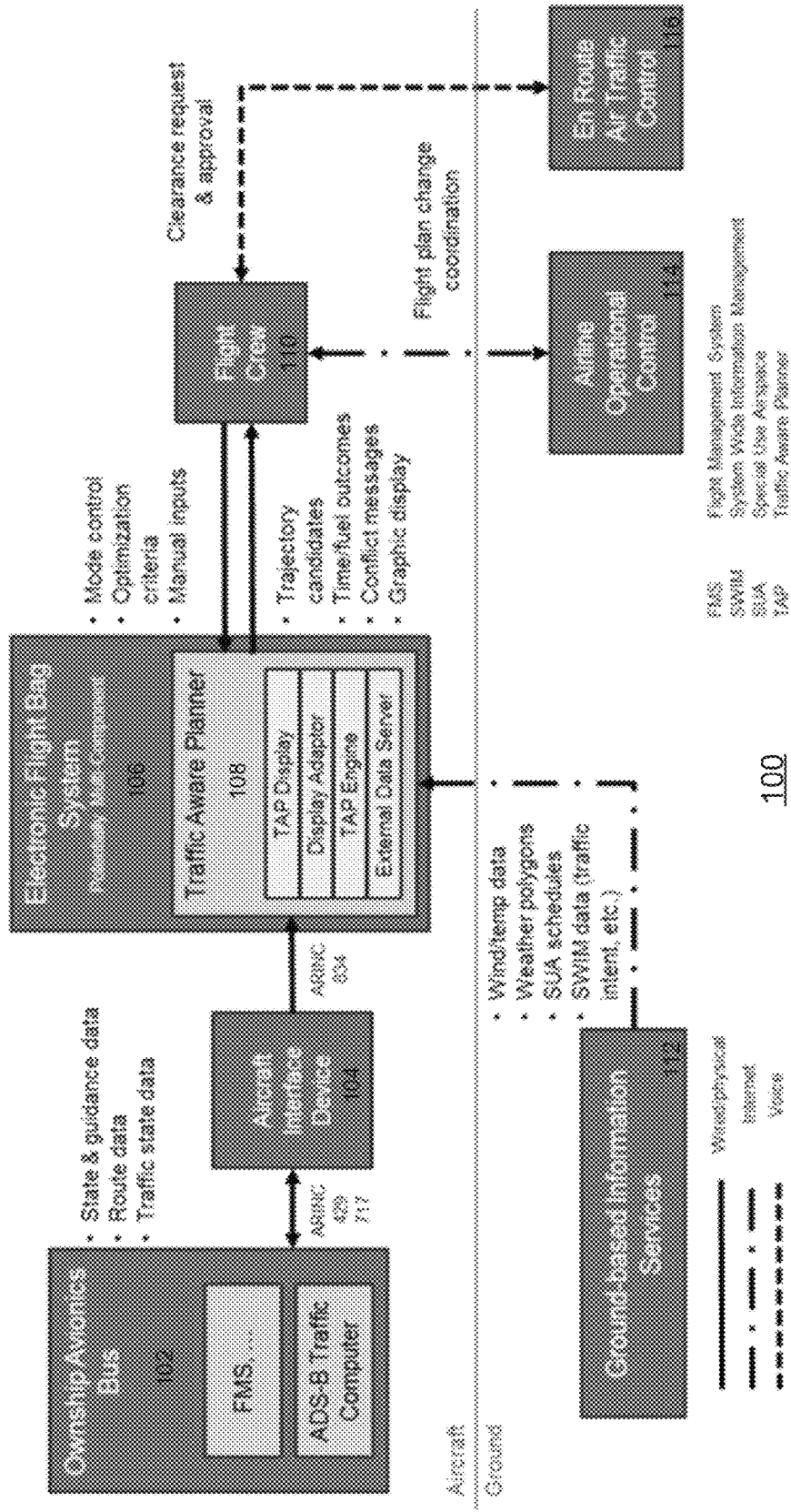
FIG. 1 is a block diagram illustrating an overview of the primary functional elements and operations of a TASAR system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

Embodiments of the disclosure are directed to systems, apparatuses, and methods for more effectively acquiring information regarding weather conditions along a flightpath and incorporating that information into a flight path optimization and planning system. In some embodiments, the system and methods may acquire substantially real-time information from pilots or other crew who have encountered a weather system or event (e.g., a wind direction or speed measurement, an observation of a storm or lightning, an observation of a difficulty in controlling an aircraft, unexpected excessive turbulence, a message confirming or identifying a potentially dangerous weather system or event) and share that information with other airborne pilots or crew (either directly or using a ground-based server). This can assist the crew of other aircraft by informing them about current conditions regarding the weather system and its potential impact on a flight trajectory through or near that weather system. This may also assist the crews of other aircraft to know how much confidence to have in a weather-based course change recommendation (which was likely based on weather data acquired by a ground-based system prior to takeoff and may have become stale and no longer reliable).

In some embodiments, and using one or more data processing techniques (such as machine learning (ML), statistical analysis, or other forms of modeling), over time the disclosed system may be able to incorporate data about the reliability or confidence level that should be associated with types of weather observations, data sources, or recommendations. In some embodiments, sensor or image data obtained by an aircraft encountering a weather system or event may be provided to other airborne aircraft to enable the flight planning systems of those aircraft to better account for the weather system or event in their trajectory planning, such as by more accurately assessing the risk of the aircraft flying close to (or through) the weather system or event.

Embodiments enable users of the disclosed system and methods to change flight trajectory or aircraft configuration more confidently based on more accurate information or assessments of weather systems or events. For example, a flight trajectory may be altered from an initial trajectory between waypoints that would encounter strong winds or lightning to one that seeks to avoid a storm or only travel near the edge of more severe weather events. As another example, the information provided by another pilot or aircraft may be used to cause an aircraft or pilot to alter an angle of approach when heading into winds, based on whether the winds are stronger or weaker than expected if based only on the ground-based weather data. Embodiments provide a pilot and other crew with a display or trajectory overlay that illustrates more current weather-related information and enables the pilot to decide whether to alter their current trajectory, which was likely planned using stale or least possibly inaccurate weather information.

As background, a conventional implementation of the TASAR system incorporates an aircraft performance model (APM) that is based on the following:

Aircraft Performance Model
  There are four forces that impact aircraft performance, one in each direction of upward (lift), downward (gravity), forward (thrust), and backward (drag). All except gravity are variable, and may depend on speed, airframe characteristics, aircraft weight, among other features;
    In some implementations, the APM is represented in the form of a grid of aircraft drag at a specific airspeed;

Quantifying Performance
Nautical Air Miles (NAM) is a common framing of aircraft performance and depending on the aircraft it may be per 1,000 pounds for a narrow body like a Boeing 737, or per 10,000 pounds for a wide body like a Boeing 777;
Operating Envelopes
There are various stages of flight known as the operating envelope and these include, but are not limited to, flight segments such as climb (which has very heavy fuel burn), cruise (which as a more stable fuel burn), and descent (which is typically light on fuel burn);
Cost Index, or Speed Schedule
In commercial aviation, a Cost Index is assigned on a per flight basis, though some airlines use the same Cost index by default. While the ranges vary by aircraft type, it is typically between 0 and two nines (99) and can also get up to four nines (9999). With Cost Index the range is from an emphasis on flight time reduction (where it's vital that a flight be on time), or fuel reduction (where fuel conservation should be a priority);
Drag Polars
An APM is represented on an X/Y axis where the X axis is airspeed, and the Y axis is drag. Performance models (in the context of a given operating envelop) may be represented as a curve where, as the aircraft goes faster, drag will change. At a certain point, the performance will spike up sharply in a way sometimes loosely referred to as a "hockey stick" and in this case the hockey stick effect on drag occurs because of the generation of a shockwave. At a certain airspeed, and with each successive increase in speed, the drag increases significantly, which negatively impacts fuel burn.

A given flight plan consists of a sequence of waypoints, which are fixed location latitude/longitude points that typically have a three to five letter name. A flight plan will include specifics of anticipated wind strength, altitude, and airspeed. On that basis, a forecast is created for how much fuel will be burned between each waypoint, and there is a published (internally for the pilots) anticipated remaining fuel at each waypoint.

FIG. 1 is a block diagram illustrating an overview of the primary functional elements and operations of a TASAR system 100. FIG. 1 includes two primary functional segments, those located on the Aircraft and those that are located on the Ground. This is one representation of how the system can work—some of these components can be provided in multiple ways:
Aircraft-Based
  Ownship Avionics Bus (102). The TASAR system uses State Data such as weight, airspeed, barometric pressure, and other parameters. In this example, State Data comes from ADS-B traffic information, through it is possible to have traffic as well as active route data (shown here as the Flight Management System, FMS) provided by a ground source (via services known as System Wide Information Management, or SWIM). Data is transferred using a specific set of standards known as ARINC and in this example, the data complies with ARINC-429 and ARINC-717 standards;
  ADS-B: Automatic Dependent Surveillance-Broadcast. The source is each individual aircraft which must be equipped for ADS-B "Out". It broadcasts the aircraft identification, altitude, speed, heading for ADS-B "In" equipment to receive. ADS-B receivers are located both on other aircraft and on the ground and collectively show the real-time aircraft traffic in the National Airspace System (NAS). Receivers on the ground are connected via the FAA to the Internet, allowing individuals and companies to interrogate any aircraft in the NAS to determine its ID, heading, speed, altitude. TASAR in combination with the assignee's application uses this information to make recommendations for route changes to pilots which will not conflict with other aircraft;

Aircraft Interface Device (AID—104). This is a piece of hardware that resides on the aircraft. In some cases, special AIDs will be installed for the software described herein, and in other cases the system can obtain the State Data it needs from an AID already onboard the aircraft (such as the in-flight connectivity server provided by a vendor such as Intelsat/Gogo);

Electronic Flight Bag (EFB—106). The EFB is a device, such as a laptop or tablet computer (e.g., an iPad, manufactured by APPLE) that is assigned to a pilot. A set of applications the pilot uses while in flight is installed on the EFB. This typically includes a set of modules or functions for the Traffic Aware Planner (TAP) 108. The TAP is used to generate the trajectory optimizations and recommendations. The TAP may incorporate or have access to an aircraft performance model (APM) used as part of generating the trajectory optimizations or recommendations; TAP is a subset of the overall system and is where the route change recommendations are generated. A pilot interfaces with TAP through a user interface. TAP and the user interface can be co-resident on a single device or TAP can be on an AID 104 which communicates with the user interface, with the user interface on a device the pilot can interface with (e.g., tablet, laptop, PC), typically via Wi-Fi;

Flight Crew (110). The flight crew (e.g., pilot, co-pilot, navigator) receives trajectory optimization candidates, as well as route changes of their own choosing (or one recommended by Air Traffic Control (ATC)), and it is up to the pilot to decide which changes to accept. Most airlines have both vertical and horizontal thresholds for approval and if a Pilot is pursuing a route change outside of those thresholds, they are expected to contact their own internal dispatch team for approval;

Ground-Based

Ground-Based Information Services (112). There are several options for ground feeds. The most common are for wind, convective weather (specifically convective diagnosis oceanic (CDO) and cloud top heights (CTH) data), special use airspace (SUA), and SWIM if there is not access to an internal bus for active route information on the aircraft. Additional ground feeds may include forecast winds, clear air turbulence, and volcanic ash, among others;

Airline Operational Control (114). This is referred to as Dispatch by many airlines, and dispatch may need to approve trajectory changes beyond certain vertical and lateral thresholds;

En Route Air Traffic Control (ATC—116). No change can be made to an active route without approval from ATC, whether they initiated the change or not. SWIM is an FAA service, so largely only available in the continental US.

Figure 2:
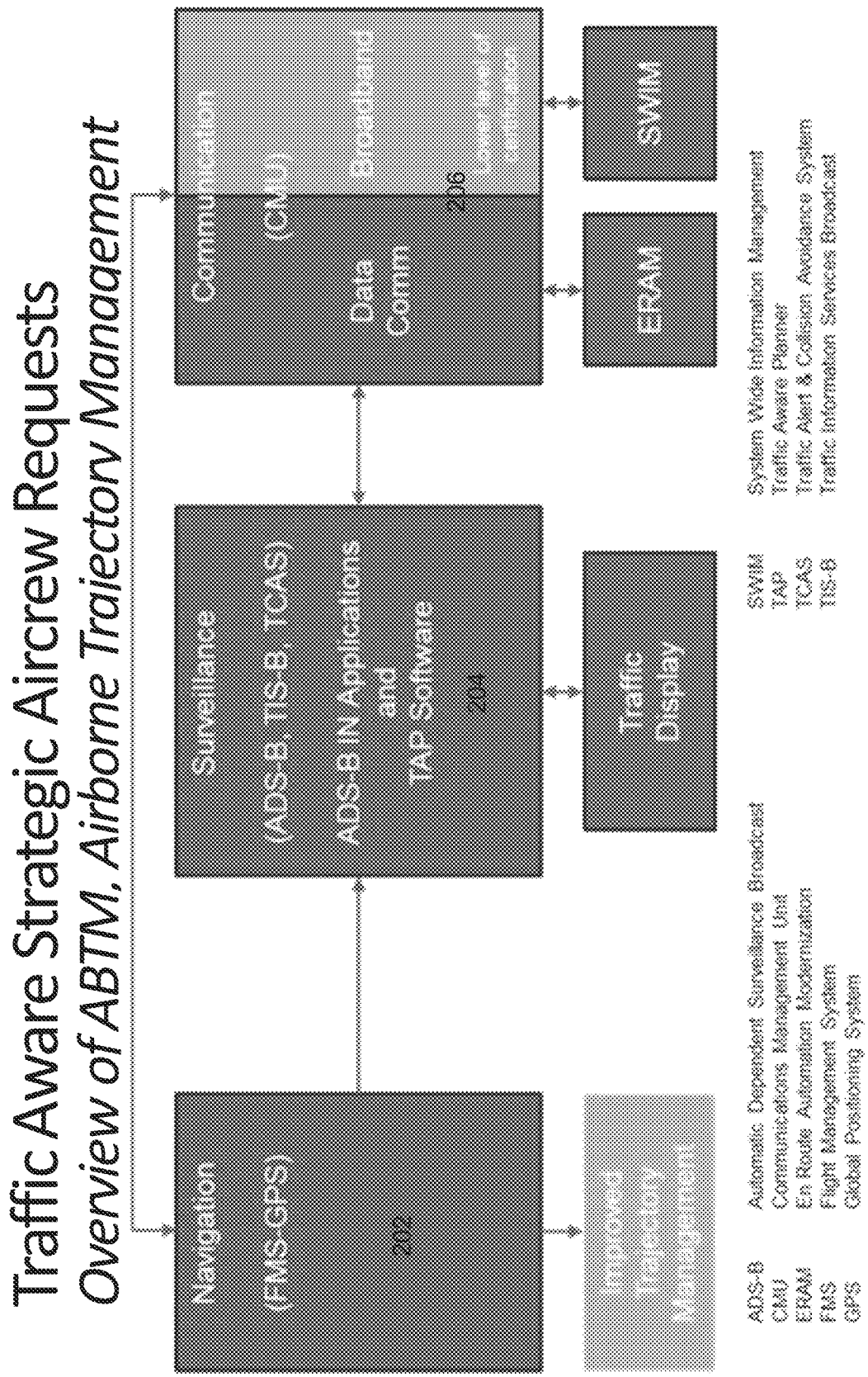
FIG. 2 is a block diagram illustrating the interactions between the Navigation, Surveillance, and Communications functions or operations of a TASAR system.

FIG. 2 is a block diagram illustrating the interactions between the Navigation, Surveillance, and Communications functions or operations of a TASAR system. FIG. 2 illustrates certain high-level functional aspects of what is shown in FIG. 1. For example:

Navigation (202). This functional capability is where suggested route optimizations are generated;

Surveillance (204). This is where real time traffic and TAP reside; and

Communication (206). Architecturally, there are multiple ways the system can obtain the data it needs to make the route optimization calculations.

Figure 3:
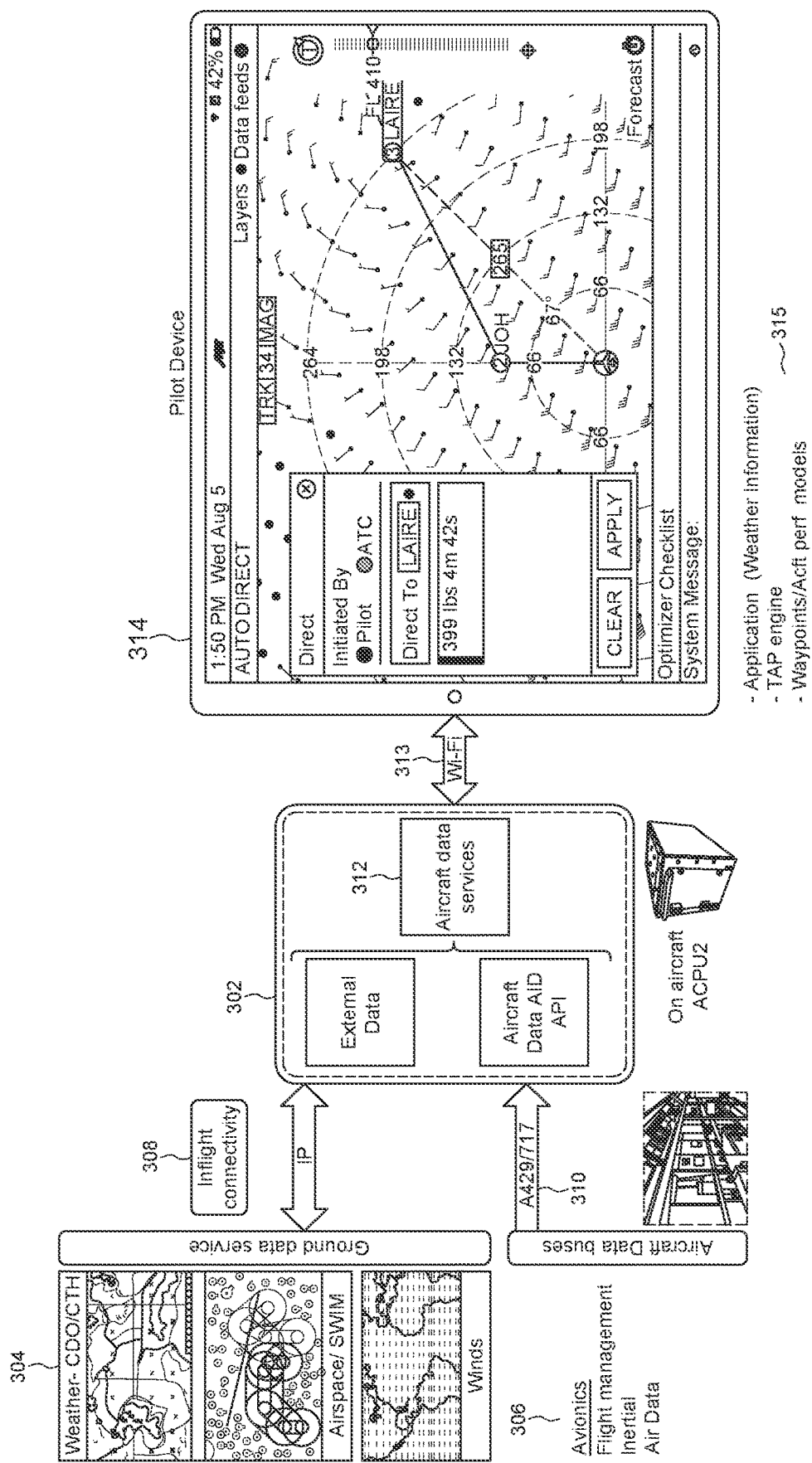
FIG. 3 is a diagram illustrating the one or more potential sources of weather and other data that may be used by a conventional flight planning system.

FIG. 3 is a diagram illustrating the one or more potential sources of weather and other data that may be used by a conventional flight planning system. Note that the sources shown in the figure do not include information or observations provided by other pilots who may have encountered a weather event or system along the same or a similar flight-path.

Referring to the figure, in some embodiments, the on-board system 302 receives data from ground-based services 304 and on-board avionics 306. As examples, the ground-based services 304 may provide weather data (termed convective weather data and comprising convective diagnosis oceanic (CDO) and cloud top heights CTH data), special use or restricted airspace data (SUA), and wind data. The on-board avionics data 306 may provide data from systems and sensors on an aircraft, such as flight management, inertial, or environmental data.

The system may also be able process more ground feeds such as clear air turbulence, volcanic ash, and forecast winds. For a typical commercial flight, weather conditions are printed or downloaded as much as an hour or more prior to departure, so the information is already an hour old and may be stale/inaccurate when the flight takes off. This can be a problem, as the conditions represented by the pre-flight data can change rapidly; it can take less than 15 minutes for a convective weather storm to develop and special use airspace (SUA) can close on very short notice. Even if winds change relatively slowly compared to the formation of a storm or a change to the special use airspace, if an aircraft is four hours into a six hour flight, with five-plus hour old wind data, that wind data is unlikely to be accurate.

Although a system default may be set to update winds every hour, and weather and SUA every 15 minutes, these feed frequencies are configurable and given the cost of transmitting large volumes of data to an aircraft, the rate at which ground feeds are transmitted to in-flight aircraft is likely to vary between airlines. This further suggests that weather data, and in particular convective weather event data being used by an in-flight aircraft is likely to be inaccurate. This can have a significant impact on safety, passenger comfort, and aircraft performance during a flight.

Referring again to FIG. 3, the ground-based data is provided to an aircraft through a form of inflight connectivity 308, such as satellite or direct transmission to an aircraft. The on-board sensors and avionics data are provided to the on-board system 302 using a suitable aircraft specific data bus 310. The two sources of data are input to on-board system 302 (termed "External Data" and "Aircraft Data AID API" in the figure) and provided to an Aircraft Data Services module or function 312. Aircraft Data Services module or function 312 may process the input data and generate data that is provided to a device 314 in which a route or trajectory planning application is installed. As suggested by the figure, the data may be transmitted from system 302 to device 314 using an onboard Wi-Fi network 313. Pilot device 314 may be a laptop or tablet computing device and may have one or more applications installed to assist with trajectory and route planning. This may include the TAP engine described previously.

Although FIG. 3 illustrates the sources of weather-related data used in a conventional flight planning system, in accordance with the system and methods described herein, in some embodiments, pilot device 314 may include an application 315 that is configured to provide and receive weather-related data and information (referred to as "Application (Weather Information)" in the figure). This application (Weather Information) 315 operates to provide (more) current data and information regarding weather systems and events to a ground-based server and/or receive additional community-provided weather data and information from the server. The received data and information may be used as an input to the trajectory planning application, or as a source of additional information displayed as an overlay on a planned trajectory. In some embodiments, the application installed in pilot device 314 may operate to implement one or more of the following functions or capabilities:

Acting as a Source of Community-provided Weather Information for Use by Others:
  Allow a crew member to input observations, messages, comments, etc. regarding a weather system or event encountered along or nearby a flight trajectory;
    The observations, messages, comments may include confirmation of an event or weather characteristic, information regarding a present status of a new or previously reported weather event, etc.;
    The application may be able to include data such as sensor measurement data or images relevant to the weather conditions outside of the aircraft (such as windspeed, wind direction, humidity, etc.) and include them in the provided information;
    The application may provide the observations, messages, comments and/or sensor measurement data to other aircraft, either directly via an aircraft-to-aircraft communications system or indirectly by sending the information and data to a ground-based server;

Acting as a Recipient of Community-provided Weather Information Sourced by Others:
  Receive weather-related data, information, messages, images, sensor measurements, etc. from other aircraft, either directly or indirectly via a ground-based server;
  After receiving the weather-related data, information, etc., the application may process the received data, information, etc. into a form in which it may be used to generate one or more images or overlays to be presented along with an image of the aircraft's current trajectory;
    Either prior to generating the overlay or overlays, or as part of the generated overlay(s), the application may present the pilot with the option of accepting, commenting, or rejecting the weather-related data, information, etc. obtained from the other aircraft (sources);
    If accepted, the weather-related data, information, etc. obtained from the other aircraft may be used to generate the overlay(s), where the overlay(s) may indicate one or more of:
      A general shape of a weather system or event in relation to the aircraft's current trajectory (where the trajectory is indicated by waypoints, altitudes, airspeed, etc.);
      If available, a measure of the reliability of the more current data, information, etc. regarding the weather system or event;
      If available, an indication of the time since (or time at which) the additional data, information, etc. was first provided from the other aircraft;
      A user interface element or control to enable the user to zoom in or zoom out from the weather system or event;
      If available, an indication of the windspeed and/or wind direction for a weather system or event (and hence the expected motion of a weather system or event);
  In some embodiments, the weather-related data, information, etc. obtained from the other aircraft may be input to an application that generates recommended trajectory changes based on the input;
    Although this application may be the TAP engine described previously, it may also be the separate application that performs the functions described with reference to generating one or more images or overlays presented along with an image of the aircraft trajectory;
  If the system includes a ground-based server, then the server may receive weather-related data, information, etc. from multiple aircraft and identify a location of weather systems and events for which it has received data, information, etc.;
    This may include determining the reported position of weather system(s) and event(s), and may include generating a prediction or estimation of their expected changes in position and/or strength over time;
  The server may then determine which, if any, airborne aircraft are likely to encounter or be impacted by a weather system or event for which additional data, information, etc. is available;
    This may include accessing a database of the expected flight trajectories of airborne aircraft and determining which might be likely to encounter or be impacted by a weather system or event based on the aircraft flight trajectory and the expected position, motion, and strength of a weather system or event.

Note that in one embodiment, a flight planning system (such as the one described with reference to FIGS. 1 and 2) that is modified to include the functions and data sources described herein may receive information and observations regarding weather events and systems from pilots (either directly or indirectly) who are encountering or have encountered the event or system. The location of the weather event or system and its characteristics (windspeed, direction, motion of center of storm, etc.) may be used to determine which airborne aircraft along the same or a substantially similar flightpath may encounter the weather system or event, and the updated or more current weather information may be provided to them. In some embodiments, the updated or more current weather information may be used to generate enhancements or overlays to a display of a current trajectory of an aircraft, either by a separate application or using the information as inputs to a trajectory planning application.

As an example embodiment, a community-based weather system and application as described herein may comprise a ground-based server and an on-board application. The on-board application may be installed in a device used by a crew member, and further, the application may be installed on devices on a plurality of aircraft.

Each On-board Application may Perform the Following Operations or Functions:

(1) As a source of weather-related data for use by other aircraft

A user (pilot, co-pilot, navigator) may input an observation or potential hazard to the system;
- The user may input the observation, note a potential hazard, and/or provide a weather measurement using a messaging application, by selection of specific icons or user interface elements, providing inputs in response to questions, or other suitable mechanism;
- user may report a hazard, and then other users may validate, verify, or modify the information about that hazard;
  - over time, and either as no more feedback is received, or if a user reports the hazard is no longer present, then the hazard can be removed/downgraded;
- the information contained in an observation may include sensor measurements obtained in real-time by sensors on-board an aircraft (e.g., wind velocity and direction, humidity, temperature, storm imagery, lightning strikes, forces due to turbulence, etc.);
- the data and information are provided to a ground-based server for storage, processing, and distribution to other aircraft;

(2) As a recipient of weather-related data sourced from other aircraft:

In some embodiments, the information and data received from the ground-based server is incorporated into a display that is made available to the crew of a receiving aircraft;
- the display may be presented as an overlay to a trajectory generated by a TAP application, and may include one or more of:
  - a user interface element to allow a user to accept or reject the received data, information, etc. regarding weather systems and weather events—the system may allow the user to ignore the weather-related data, information, etc. or confirm or deny the presence of a weather system or event along their flight trajectory;
    - in some embodiments, a user may be able to access information confirming the presence or absence of a weather system or event or another measure of the confidence level expected for the data, information, etc.) prior to that data, information, etc. being used as part of a trajectory overlay;
    - the information confirming the presence or absence of the weather system or event may be derived from a statistical analysis or model that provides an indication of the reliability of the data, information, etc. based on route, airline, aircraft, pilot, historical reliability, etc.;
  - an enlargement or other modification in shape or size to a region on an image of a trajectory or trajectory segment that illustrates the most current weather system information and weather events;
  - a set of user interface elements to permit a user to change information regarding an aircraft's heading or altitude and in response to be able to examine the current weather system information and weather events based on those changes;
  - a set of user interface elements to permit a user to overlay specific weather data, information, etc. or events on a track of the aircraft's present trajectory;
  - a process to initiate a recalculation of the aircraft's recommended trajectory based on the current weather data, information, etc. and weather events;
    - this may automatically alter the weather-related information input to the TAP engine to include the more recent data, information, etc., and result in the generation of a new set of trajectory recommendations, or may be based on logic implemented by a separate application;
  - a the display and the software application used to generate the display may include user interface elements and tools to enable a user to:
    - set thresholds—a user may set threshold values for notification of weather-related data, information, etc. or for recommending a change to a current trajectory;
      - In the case of turbulence, the levels may be light, moderate, severe, and extreme. Depending on the type of aircraft and pilot preferences, some might only want to be notified of severe and extreme turbulence, and those are thresholds that may be set (some carriers may make these decisions for their pilots);
  - the aircraft type can influence which information is considered valuable to a crew. A wide body aircraft can burn 10,000 pounds of fuel per hour, so a change in wind direction can make a more substantial difference in fuel burn than for a narrow body aircraft, for example;

(3) The ground-based server that is part of the system may comprise:
- an application that processes the received weather-related data, information, etc. and places it into a format so that it may be transmitted to one or more aircraft in accordance with a desired protocol;
- the application may interconnect with a service, database, or application that is aware of other aircraft trajectories and execute logic to determine which of those may benefit from being made aware of the more current weather-related data, information, etc.;
- the ground-based server may execute logic to determine an aircraft's trajectory and then determine whether observations or data regarding weather systems and events are available from other aircraft that is timely and may be relevant to that aircraft;
- in some embodiments, the ground-based server may automatically "push" weather related data, information, etc. obtained from other aircraft to an aircraft on a flight trajectory that is likely to encounter a weather system or event or is on a trajectory for which updated weather-related data and information is available.

As mentioned, in some embodiments, the overlays or images that illustrate the more current weather-related data and information may be generated by an application executing on the pilot device and displayed using that application. This can allow a user to have greater flexibility in accepting the data and information and in how it is used. For example, a user may receive a ground feed from a server and can choose to confirm or deny the presence of a specific system or event. That feedback is then provided to the ground-based server (e.g., via a Wi-Fi connection from the pilot device). Based on what data, information, etc. pilots have requested or subscribed to, the feedback may be provided to other active users whose aircraft are proximate (e.g., up to 300 miles from the source) to the location of the user who provided the feedback, or to the location of a weather system or event for which information has been received.

Figure 4A:
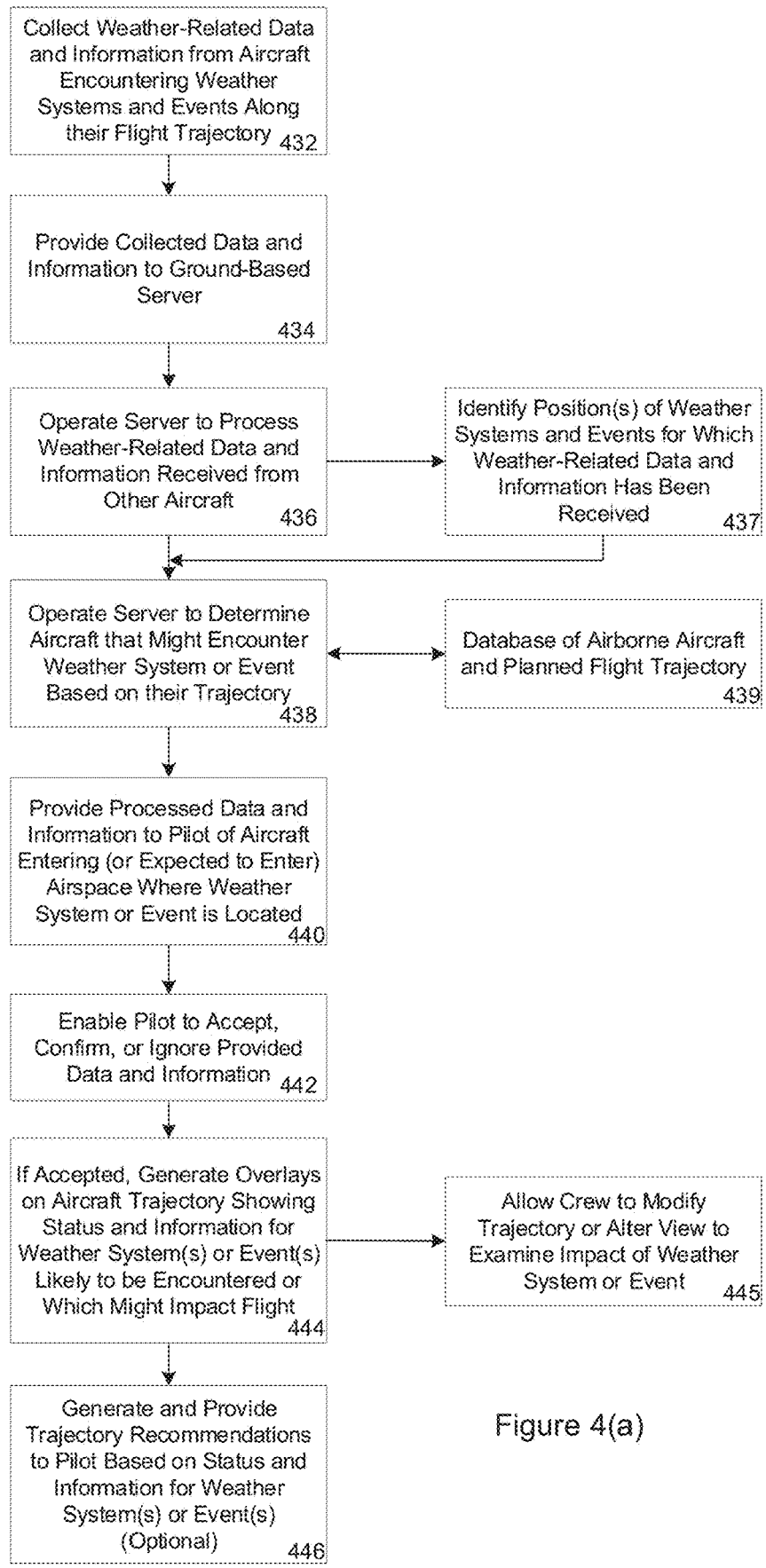
FIG. 4(a) is a flowchart or flow diagram illustrating a method, process, operation or function for acquiring information regarding a weather system or event from pilots who are encountering or have recently encountered that system or event, and processing that information to make it available for use by a pilot who has not yet encountered that system or event, in accordance with some embodiments of the systems and methods described herein.

FIG. 4(a) is a flowchart or flow diagram illustrating a method, process, operation or function for acquiring information regarding a weather system or event from pilots who are encountering or have recently encountered that system or event, and processing that information to make it available for use by a pilot who has not yet encountered that system or event, in accordance with some embodiments of the systems and methods described herein.

As shown in the figure, in some embodiments, a system configured to implement one or more of the methods, processes, operations, or functions described herein may operate to:

- collect weather-related data and information from a plurality of aircraft that have encountered or flown nearby weather systems and events while flying along their flight trajectory (as suggested by step or stage 432);
  - as described this data and information may include sensor readings, crew observations or messages, images, etc.;
- provide the collected data and information from each aircraft to a ground-based server (as suggested by step or stage 434);
  - the data and information may be provided to the server via a satellite link, direct transmission, connection to the Internet, etc.;
- the ground-based server receives data, information, etc. from a plurality of aircraft and (if necessary) processes it to place the received data, information, etc. into a format in which it may be provided to and used by aircraft that are expected to encounter or be impacted by one of the weather systems or events (as suggested by step or stage 436);
  - this may include reformatting data, applying a threshold to the data, filtering, modeling the data, evaluating the reliability of the data, processing data to make it conform with a specific protocol, etc.;
- as part of processing the received data and information, the server may operate to determine or identify a location of a weather system or event for which it has received data, information, etc. (as suggested by step or stage 437);
  - this information may be relevant to pilots in front of and behind a weather system or event due to considerations of turbulence, headwinds, tailwinds, etc.;
- the server may operate to determine one or more aircraft that may be expected to encounter or be impacted by a weather system or event for which data, information, etc., has been received (as suggested by step or stage 438);
  - this may include accessing a database or other source of information regarding the planned flight trajectories of a plurality of aircraft expected to be airborne during a specified period and/or within a specific region (as suggested by step or stage 439);
- after identifying one or more aircraft that are expected to encounter or be impacted by a weather system or event for which data, information, etc., has been received, the server may operate to provide the processed data, information, etc. to each of the identified aircraft (as suggested by step or stage 440);
  - a the processed data, information, etc. may be provided to an application installed on the pilot device and/or to another system or application on the receiving aircraft;
- a pilot or crew member on a receiving aircraft may be provided with a mechanism to accept, confirm, or ignore the received data, information, etc.;
  - the pilot or crew member may be assisted in their decision by a measure of the reliability or a confidence level that is associated with the provided data, information, etc.;
- if the received data, information, etc. are accepted, then the application installed on the pilot device or other system/application operates to generate one or more overlays or displays that present the weather-related data, information, etc. to the pilot or crew member (as suggested by step or stage 444), where the overlay(s) or displays may indicate one or more of:
  - a general shape of a weather system or event in relation to the aircraft's current trajectory (where the trajectory is indicated by waypoints, altitudes, airspeed, etc.);
  - if available, a measure of the reliability of the more current data, information, etc. regarding the weather system or event;
  - if available, an indication of the time since (or time at which) the additional data, information, etc. was first provided from the other aircraft;
  - a user interface element or control to enable the user to zoom in or zoom out from the weather system or event, or alter a trajectory segment (as suggested by step or stage 445);
  - if available, an indication of the windspeed and/or wind direction for a weather system or event (and hence the expected motion of a weather system or event);
- if desired by a pilot or crewmember, the more current or updated weather-related data, information, etc. may be used to generate and provide a recommended change to a trajectory or flight plan;
  - this may be an optional capability and if desired, may be implemented by using the received data, information, etc. as an input to an existing or separate flight planning system (as suggested by step or stage 446).

In some cases, the data, information, etc. obtained from another pilot or pilots may be whether the reported or predicted weather system or event is present along the flightpath. In some cases, more detailed observations may be provided, such as reporting difficulties with certain maneuvers or up-to-date and substantially real-time measurements of wind velocity, wind direction, storms, etc. From one perspective, an embodiment of the system and methods represents a form of crowd-sourced real-time or substantially real-time data regarding weather systems and events along a specific flightpath and is not available to conventional flight trajectory planning systems.

Figure 4B:
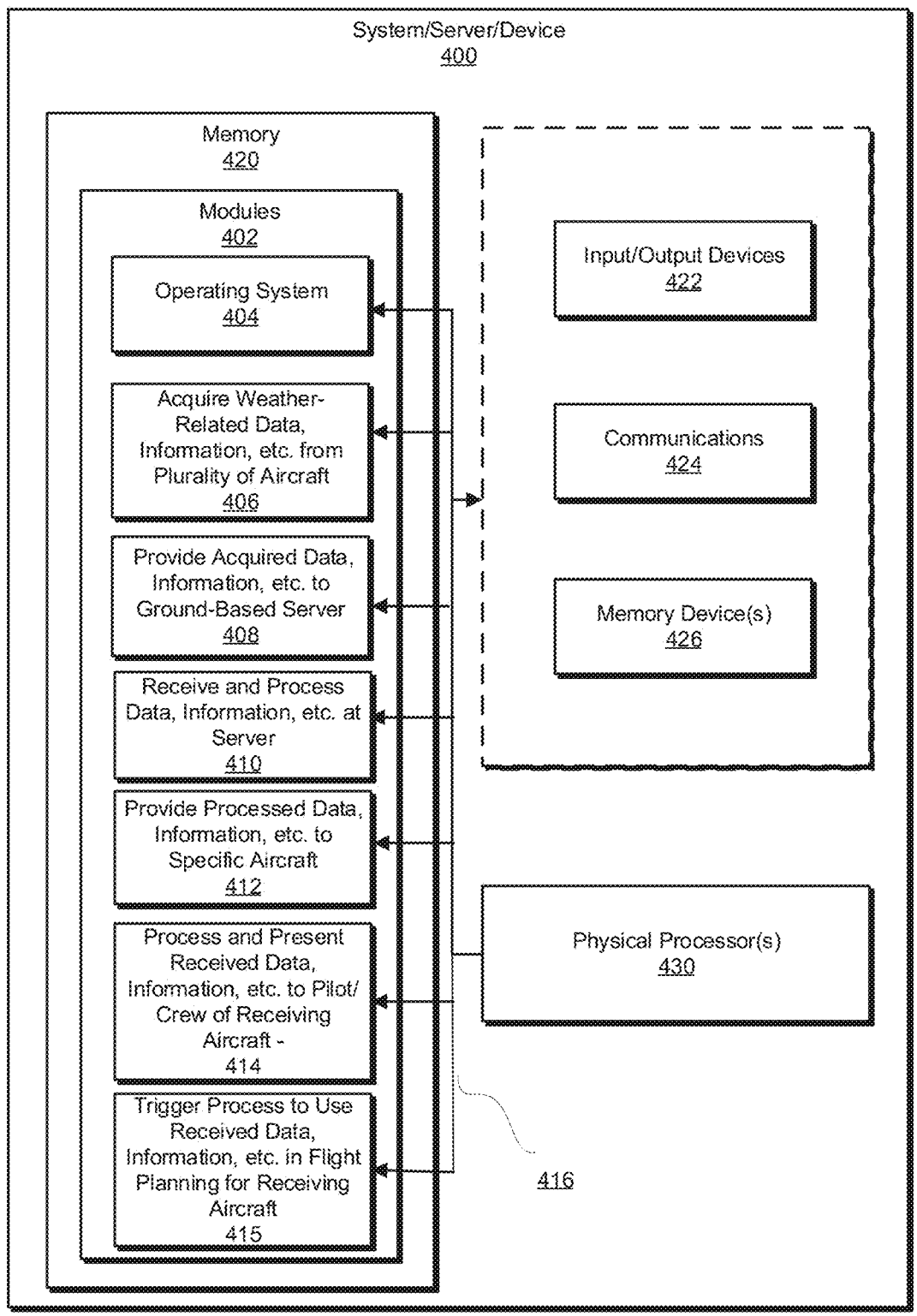
FIG. 4(b) is a diagram illustrating elements or components that may be present in a computer device or system configured to implement a method, process, function, or operation in accordance with some embodiments of the systems and methods described herein.

FIG. 4(b) is a diagram illustrating elements or components that may be present in a computer device or system configured to implement a method, process, function, or operation in accordance with some embodiments of the disclosure. As noted, in some embodiments, the disclosed system and methods may be implemented in the form of an apparatus that includes a processing element and set of executable instructions. The executable instructions may be part of a software application and arranged into a software architecture. In general, an embodiment may be implemented using a set of software instructions that are designed to be executed by a suitably programmed processing element (such as a CPU, GPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

As shown in the figure, system 400 may represent a server or other form of computing or data processing device. Modules 402 each contain a set of executable instructions, where when the set of instructions is executed by a suitable electronic processor (such as that indicated in the figure by "Physical Processor(s) 430"), system (or server or device) 400 operates to perform a specific process, operation, function or method. Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 416, which also serves to permit processor(s) 430 to communicate with the modules for purposes of accessing and executing a set of instructions. Bus or communications line 416 also permits processor(s) 430 to interact with other elements of system 400, such as input or output devices 422, communications elements 424 for exchanging data and information with devices external to system 400, and additional memory devices 426.

Further, the computer-executable instructions that are contained in the modules or in a specific module may be executed by the same or by different processors. For example, certain of the operations or functions performed as a result of the execution of the instructions contained in a module may be the result of one or more of a client (pilot) device, backend device, network element, or a server executing the instructions (or certain of the instructions). Thus, although FIG. 4(*b*) illustrates a set of modules which taken together perform multiple functions or operations, these functions or operations may be performed by different devices or system elements, with certain of the modules (or instructions in those modules) being associated with those devices or system elements.

Each application module or sub-module may correspond to a particular function, method, process, or operation that is implemented by the module or sub-module (e.g., a function or process related to acquiring, processing, and using information regarding a weather system or event obtained from other pilots to generate a recommendation to a pilot to alter their current trajectory). Thus, such function, method, process, or operation may include those used to implement one or more aspects of the inventive system and methods, such as for:
Components, elements, or an application in each of a plurality of aircraft to:
Acquire current data, information, etc. regarding weather conditions along a flightpath and within a certain range around the flightpath (as suggested by module 406);
this may include measurements from on-board sensors, visual images, crew member provided comments and observations, weather radar data from aircraft-based systems;
Process the acquired information (such as alerts, messages, sensor data) and communicate it to a ground-based server (as suggested by module 408);
Components, elements, or an application at the ground-based server to process the received weather-related data, information, etc. (if needed) and execute logic to determine which aircraft/pilots to communicate with regarding a specific weather system or event (as suggested by module 410);
as described, this may include determining a location and/or expected motion of a weather system or event;
as described, this may include accessing information regarding flight plans or trajectories of aircraft that might be expected to encounter a weather system or event;
as described, this may include comparing the location or expected location of a weather system or event to the flight plan or trajectory of aircraft expected to encounter or be impacted by a weather system or event;
in some embodiments, this may include using radar or other tracking of aircraft to determine those that might encounter or be impacted by a weather system or event whose location and motion have been determined;
this may include (if needed), determining how to format and present the acquired data, information, etc. and to which functional system(s) of the other aircraft it should be provided as data (for example, to TASAR directly, to a display or messaging application of the pilot);
Provide the processed data, information, etc. to one or more other aircraft (as suggested by module 412);
An application installed in a pilot or other device to receive the processed data, information, etc. from the ground-based server and process it for use and presentation to the pilot of the aircraft receiving the information (as suggested by module 414). In some embodiments, this may include:
Tools to let a receiving pilot confirm presence of a weather system or event;
A user interface element or control to permit the pilot/crew of the aircraft receiving the data, information, etc. to accept or not accept the received data, etc.;
If accepted, provide one or more ways to integrate the received data, information, etc. with existing weather, flight planning, and alert systems, and to;
Present a display or overlay to a pilot, where the display or overlay may indicate:
the present flight trajectory (waypoints, altitude, airspeed, etc.;
a location of a weather system or event;
information regarding the characteristics of the weather system or event;
windspeed;
direction of motion;
a measure of the reliability or confidence in the received data, information, etc.;
Optionally, and if desired, trigger a process in the TASAR or other trajectory planning system to allow a pilot of the receiving aircraft to incorporate received weather data, information, etc. into a flight planning function (as suggested by module 415);

This may be used to generate one or more recommended changes to a present flight plan based on the received weather-related data, information, etc.;

In some embodiments, the received data, information, etc. may be used to generate an updated or revised trajectory and display an updated weather polygon or other indication of a weather event that is expected to impact the flight.

With a multitude of weather-related variables and configuration options, including obtaining real-time pilot feedback regarding the validity of a weather event warning (e.g., confirmation of the presence or absence, the apparent strength, wind measurements, etc.), embodiments of the system, apparatuses, and methods described herein may help identify which (if any) inputs to a weather polygon are incorrect or have varied (e.g., there was no lightning observed), are too sensitive, or are not sensitive enough (e.g., the guidance was to fly around the weather by N miles, but the pilot believes that was too far to fly around it and would have been wasteful of time and fuel).

In some embodiments, the system may incorporate learned information about a pilot and group (e.g., an airline or a group of airlines) and their respective risk tolerance and modify weather system or event alerts or displays accordingly:

Different people and groups are likely to have different opinions with regards to what weather conditions need to be present to justify diverting an aircraft to avoid a weather-based risk—these opinions may be based on pilot experience, the type(s) of aircraft currently or previously flown, safety goals, risk tolerance, fuel costs, etc.;

Embodiments of the system and methods described herein can "learn" (based on developing a machine learning model or other training process for a model) the specific preferences of individuals and groups, and in response, contextualize that feedback for the other individuals and groups with whom the data or observations are being shared;

For example, if a system has a 0-5 scoring range for lightning risk (with 5 being the highest risk), and User A is willing to tolerate a risk of 3.5 and above, but User B has a risk tolerance of 3.0 and above, then when the risk value is 3.2, and Pilot B confirms that the risk reported by the system is valid, the system may not share that information with User A because the risk level is below his/her threshold (or the system would only share it with a disclaimer applicable to User A). However, if User B provides additional feedback that the lightning is worse than reported, in that case User A may be notified if he/she is near enough to the weather system and likely to encounter the system;

In some embodiments, the system may include the capability to learn about an aircraft's or type of aircraft's avionics and the reliability of sensor measurements and/or data processing outputs;

Similar to learning about User/pilot and group tolerances, embodiments of the system and methods may also learn if certain types of aircraft avionics consistently provide information that Users score as more or less accurate than other aircraft; and In some embodiments, the system may generate real-time global weather maps, categorized by class of weather, weather events, or risk issue(s) to provide pilots with accurate and more up-to-date information regarding weather conditions and events along and nearby a flightpath or set of flightpaths.

Figure 5:
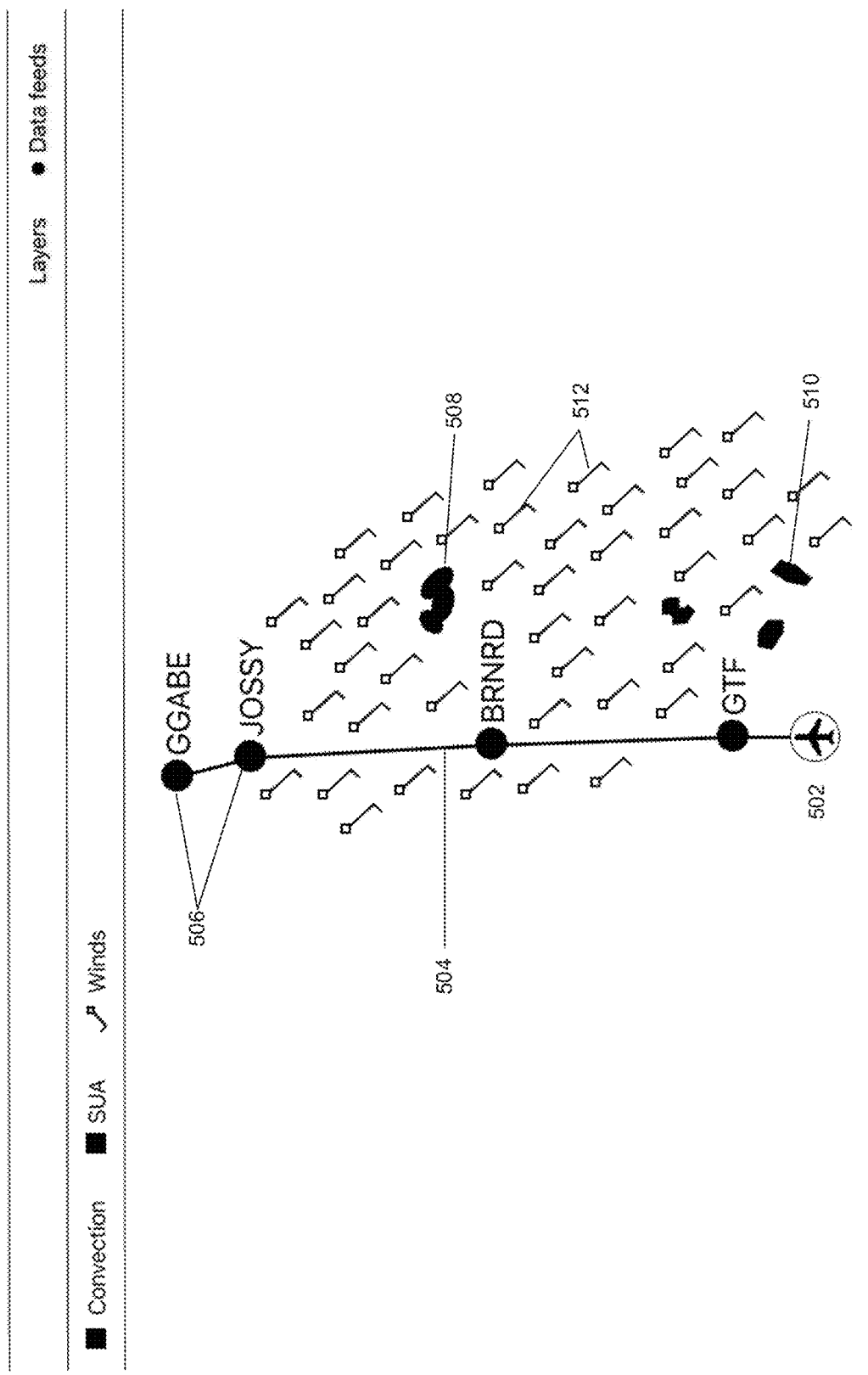
FIG. 5 is a diagram illustrating an overlay or screen display that may be generated by an embodiment to provide information regarding a weather system or event from pilots who are encountering or have recently encountered that system or event to another pilot.

FIG. 5 is a diagram illustrating an overlay or screen display that may be generated by an embodiment to provide information regarding a weather system or event from pilots who are encountering or have recently encountered that system or event to another pilot. As shown in the figure, an aircraft 502 may be following a previously generated flight plan or trajectory 504. The trajectory may comprise a set of waypoints 506. Based on the data, information, etc. received from one or more other aircraft, a display or overlay may be generated showing storms 508, weather events 510, and winds (with wind direction) 512 for use by the pilot of the receiving aircraft. The display or overlay may be provided to the pilot on a pilot device (such as a tablet, laptop, or hand-held device) that is configured with an installed application that is able to receive and process weather-related data, information, etc.

In some embodiments, certain of the methods, models or functions described herein may be embodied in the form of a trained neural network or machine learning model, where the network or model is implemented by the execution of a set of computer-executable instructions. The instructions may be stored in (or on) a non-transitory computer-readable medium and executed by a programmed processor or processing element. The specific form of the method, model or function may be used to define one or more of the operations, functions, processes, or methods used in the development or operation of a neural network, the application of a machine learning technique or techniques, or the development or implementation of an appropriate decision process. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" that exchange messages between each other. The connections have numeric weights that are "tuned" during a training process, so that a properly trained network will respond correctly when presented with an image or pattern to recognize example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

A machine learning model is a set of layers of connected neurons that operate to make a decision (such as a classification) regarding a sample of input data. A model is typically trained by inputting multiple examples of input data and an associated correct "response" or decision regarding each set of input data. Thus, each input data example is associated with a label or other indicator of the correct response that a properly trained model should generate. The examples and labels are input to the model for purposes of training the model. When trained (i.e., the weights connecting neurons have converged and become stable or within an acceptable amount of variation), the model will operate to respond to an input sample of data to generate a correct response or decision.

Any of the software components, processes or functions described in this application may be implemented as software code to be executed by a processor using any suitable computer language such as Python, Java, Javascript, C++ or Perl using conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the disclosure and does not pose a limitation to the scope of the claims. No language in the specification should be construed as indicating any non-claimed element as essential to each embodiment of the present disclosure.

As used herein (i.e., the claims, figures, and specification), the term "or" is used inclusively to refer items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present disclosure is not limited to the embodiments described above or depicted in the drawings, and various embodiments and modifications can be made without departing from the scope of the claims below.

That which is claimed is:

1. A system for acquiring and presenting information regarding weather systems and events to a selected aircraft, comprising:

an application installed on a device used by a crew member of an aircraft, wherein the application configures the device to
  receive inputs regarding weather systems and events encountered during a flight;
  provide the received inputs to a ground-based server; and
the ground-based server, wherein the server is configured to perform one or more functions comprising
  determining if additional weather-related data and information is available for the selected aircraft flight based on a trajectory of the selected aircraft and a location of a weather system or event in weather-related data and information received from one or more of a plurality of aircraft;
  providing the additional weather-related data and information to the selected aircraft if the selected aircraft is expected to encounter or be impacted by the weather system or event;
and wherein the application further configures the device to
  receive the additional weather-related data and information;
  generate a user interface element to allow the crew member to accept the received data and information; and
  if the crew member accepts the received data and information, then generate one or more displays showing the trajectory of the selected aircraft and the weather system or event in relation to the trajectory.

2. The system of claim 1, wherein the inputs regarding weather systems and events comprise sensor readings, messages, and observations of the crew regarding a weather system or event.

3. The system of claim 1, wherein the application further configures the device to provide the received data and information to a trajectory planning system or process.

4. The system of claim 1, wherein the weather event is one or more of a storm, lightning, or turbulence.

5. The system of claim 1, wherein the application further configures the device to indicate a reliability of the received weather-related data and information.

6. The system of claim 5, wherein reliability of the received weather-related data and information is determined based on an evaluation of the accuracy of previously supplied data and information from the one or more of the plurality of aircraft or the crew of the one or more of the plurality of aircraft.

7. The system of claim 1, wherein the received weather-related data and information is one or more of confirmation of a weather condition, identification of a new weather condition, estimation of the strength of a weather event, measurement of wind speed or direction, or a measurement of turbulence.

8. The system of claim 1, wherein instead of receiving the weather-related data and information from the ground server, it is received from another aircraft.

9. The system of claim 1, wherein the device is further configured to receive an input from the crew member in response to the received weather-related data and information, the input confirming or not confirming the presence of a weather system or event described in the received data and information.

10. A method for acquiring and presenting information regarding weather systems and events to a selected aircraft, comprising:

acquiring data and information from a plurality of aircraft regarding weather systems and events encountered during a flight of each of the plurality of aircraft;

providing the acquired data and information to a ground-based server;

operating the ground-based server to perform one or more functions comprising determining if additional weather-related data and information is available for the selected aircraft flight based on a trajectory of the selected aircraft and a location of a weather system or event in the acquired data and information from one or more of the plurality of aircraft; and providing the additional weather-related data and information to the selected aircraft if the selected aircraft is expected to encounter or be impacted by the weather system or event;

receiving the provided additional weather-related data and information at the selected aircraft, wherein a device on the selected aircraft is configured to generate a user interface element to allow a crew member to accept the received data and information; and if the crew member accepts the received data and information, then to generate one or more displays showing the trajectory of the selected aircraft and the weather system or event in relation to the trajectory.

11. The method of claim 10, wherein the acquired data and information is in the form of one or more of sensor readings, messages, and observations regarding a weather system or event.

12. The method of claim 11, further comprising providing the received weather-related data and information to a trajectory planning system or process.

13. The method of claim 10, wherein the received weather-related data and information includes an indication of a reliability of the weather-related data and information.

14. The method of claim 10, wherein the received weather-related data and information is one or more of confirmation of a weather condition, identification of a new weather condition, estimation of the strength of a weather event, measurement of wind speed or direction, or a measurement of turbulence.

15. The method of claim 10, further comprising receiving an input from a crew member of the selected aircraft at the ground-based server in response to the received weather-related data and information, the input confirming or not confirming the presence of a weather system or event described in the received data and information.

16. The method of claim 10, wherein the weather event is one or more of a storm, lightning, or turbulence.

17. A set of a set of computer-executable instructions, wherein when executed by a processor or processors, the set of instructions cause the processor or processors to perform one or more operations or functions, where the operations or functions comprise:

acquiring data and information from a plurality of aircraft regarding weather systems and events encountered during a flight of each of the plurality of aircraft using an application installed on a device used by a crew member of each of the plurality of aircraft;

receiving the acquired data and information at a ground-based server;

operating the ground-based server to perform one or more functions comprising determining if additional weather-related data and information is available for a selected aircraft flight based on a trajectory of the selected aircraft and a location of a weather system or event in the acquired data and information from one or more of the plurality of aircraft; and providing the additional weather-related data and information to the selected aircraft if the selected aircraft is expected to encounter or be impacted by the weather system or event;

operating the device used by a crew member of the selected aircraft to receive the provided additional weather-related data and information, wherein the device used by the crew member of the selected aircraft is configured to generate a user interface element to allow a crew member to accept the received data and information; and if the crew member accepts the received data and information, then to generate one or more displays showing the trajectory of the selected aircraft and the weather system or event in relation to the trajectory.

18. The set of computer-executable instructions of claim 17, further comprising instructions that cause the processor or processors to provide the received weather-related data and information to a trajectory planning system or process.

19. The set of computer-executable instructions of claim 17, wherein the acquired data and information is in the form of one or more of sensor readings, messages, and observations regarding a weather system or event.

20. The set of computer-executable instructions of claim 17, wherein the weather event is one or more of a storm, lightning, or turbulence.

* * * * *